INVENTORS.
Billie G. Nail
Eugene R. Sabin
BY
Hovey, Schmidt, Johnson & Hovey.
ATTORNEYS INVENTORS.
Billie G. Nail
Eugene R. Sabin
BY
Hovey, Schmidt, Johnson & Hovey
ATTORNEYS.

Aug. 13, 1963  B. G. NAIL ETAL  3,100,585
CREAM DISPENSING APPARATUS FOR COFFEE VENDING MACHINE
Filed Oct. 28, 1960  4 Sheets-Sheet 4

INVENTORS.
Billie G. Nail
Eugene R. Sabin
BY
Hovey, Schmidt, Johnson & Hovey
ATTORNEYS.

United States Patent Office
3,100,585
Patented Aug. 13, 1963

3,100,585
CREAM DISPENSING APPARATUS FOR COFFEE VENDING MACHINE
Billie G. Nail, Kansas City, Mo., and Eugene R. Sabin, Prairie Village, Kans., assignors to The Vendo Company, Kansas City, Mo., a corporation of Missouri
Filed Oct. 28, 1960, Ser. No. 65,649
18 Claims. (Cl. 222—63)

This invention relates to liquid dispensing mechanism and particularly to apparatus for permitting introduction of fresh cream into freshly prepared coffee in a vending machine of the type which prepares a single cup of coffee in response to deposit of coins of predetermined value in the machine.

Various types of automatic coffee vending machines have been proposed and commercialized in recent years, particularly with the advent of coffees of the instant type which are soluble in hot water and thereby preclude the necessity of brewing the coffee. Difficulties have been experienced in attempting to brew single cups of coffee and it has been determined that brewing of a relatively large quantity of coffee at predetermined intervals, followed by dispensing of such brewed coffee in single cup increments, is unsatisfactory because the coffee soon becomes stale and the flavor thereof deleteriously affected. Single cup brewing machines represent the most recent additions to the coffee vending machine field, and which are capable of effecting brewing of each cup from ground coffee stored in the machine.

A collateral problem to preparation of coffee of satisfactory strength and flavor, has been the attempts to provide means for introducing cream into the coffee for those persons who desire to drink coffee in this manner. The introduction of powdered cream products onto the market led to one attempted solution to the problem in that it was unnecessary to provide refrigeration for the cream product in order to prevent spoilage thereof, and the dry cream product lent itself to dispensing into the coffee cup in measured amounts.

The utilization of powdered cream did not solve the problems however, not only because of the fact that such cream is not as satisfactory from a taste standpoint, but it also presented some difficulties with respect to effecting dissolving of the powder in the coffee in the absence of agitating the liquid. Furthermore, it was found to be extremely difficult to properly introduce the powdered cream into the freshly prepared cup of coffee because of the high humidity of the area surrounding the hot cup of coffee which thereby resulted in the powdered cream becoming moist and interfering with operation of the cream dispensing mechanism, necessitating frequent cleaning of the parts to overcome the tendency of the cream to agglomerate and bridge across the openings in the dispenser unit and thus resulting in insufficient amounts of the powdered cream being directed to the coffee product. Furthermore, agglomeration of the powdered cream interfered with proper dissolving of the same in the coffee and increased the requirement of stirring of the coffee product prior to the customer removing the coffee from the vending machine.

It was recognized that the utilization of fresh cream in the vending machine was the preferred solution to the problem but the rapid spoilage of the cream deterred use thereof from both a health and a satisfactory product standpoint and further, because of the expense involved in providing means for preventing souring of the cream without constant or very frequent operator attention over the machine to maintain the same in a sanitary condition and to avoid spoilage of the cream.

It is therefore the primary object of the present invention to provide liquid dispensing mechanism adapted to be placed in a vending machine or similar unit for delivering predetermined quantities of fresh cream or the like to a cup of coffee freshly prepared in such machine, with sanitary conditions being maintained in the machine at all times and with the cream being maintained under conditions preventing rapid souring thereof without very frequent servicing of the vending machine being required.

Another important object of the invention is to provide a cream dispensing unit adapted to be utilized in coffee vending equipment wherein the dispensing mechanism includes a refrigerated housing for the cream and including novel structure for delivering the cream from the refrigerated housing to the freshly prepared cup of coffee without substantial change in the temperature of the cream contained in the housing so that souring thereof is prevented, notwithstanding the fact that the machine is serviced only at daily or somewhat longer intervals, and with the entire machine being positioned in an area where the ambient temperature conditions would otherwise result in rapid spoilage of the cream stored in the coffee vending equipment.

A further important object of the invention is to provide fresh cream dispensing mechanism for a coffee vending machine or the like wherein souring of the cream is prevented during storage thereof in the machine by virtue of disposition of such cream in a refrigerated area, and with mechanism being operably coupled to the source of fresh cream for extending a cream delivery tube out of the refrigerated area for such cream and into overlying relationship to the freshly prepared cup of coffee, whereupon a preselected amount of cream is delivered into the coffee and the tube then returned to the refrigerated area so that not only is the cream supply maintained under refrigerated conditions at all times, but the delivery tube for such cream and normally filled with the latter, is also kept under refrigerated conditions except during the actual dispensing cycle, so that souring or spoilage of the cream in the delivery tube is precluded.

A still further significant object of the instant invention is to provide cream delivery mechanism of the type referred to which comprises a substantially independent unit capable of being placed in existing machines as well as those to be manufactured in the future, without substantial modification of the basic operation of the coffee preparing components or the principles of operation thereof.

Another important aim of the present invention is to provide liquid dispensing mechanism for vending machines adapted to deliver cream into a freshly prepared cup of coffee wherein the refrigerated housing for the cream is adapted to receive a plurality of containers for such cream to increase the capacity of the machine and thereby the intervals of servicing, with novel structure being provided in the refrigerated housing and operably coupled to the sources of cream for delivering cream from one of the sources to the coffee station until such first cream source becomes depleted, whereupon such depletion is sensed by the unit and another cream source switched into the dispensing cycle so that dispensing of the cream from the individual containers therefor is rendered automatic by virtue of the fact that cream is available for the coffee for an extended period without servicing thereof being necessary.

Also an important object of the invention is to provide liquid dispensing mechanism as described wherein the mechanism is constructed in a very simple form to minimize the work of the person servicing the unit notwithstanding the automatic operation of the same and completely avoiding the necessity of the serviceman having special tools in order to effect replacement of the cream containers, the apparatus for pumping the cream from the sources thereof to the coffee station, and without the necessity of changing the disposition of a cream receptacle in the refrigerated housing, which still has some cream left therein at the time of servicing of the entire machine.

A still further important object of the invention is to provide cream dispensing mechanism wherein the cream does not contact any of the components of the actual delivery mechanism, thereby simplifying cleaning of the unit to maintain the same in a sanitary condition and furthermore avoiding the problems of clogging or sticking of the operating components by virtue of solidification of the cream, which could occur in pumps and lines if the cream were directed therethrough in accordance with prior mechanisms. In this respect it is another important object to provide cream dispensing mechanism as referred to wherein the pump means for delivering the cream from respective sources thereof to the coffee station, may be readily disassembled for cleaning purposes without special tools being required and in a very short period of time by virtue of the novel interconnecting elements employed to join the various parts of the pump means.

Other important objects of the invention relate to the utilization of light sensing means adapted to be positioned adjacent one of the cream tubes leading from the source thereof to the delivery station, to sense cessation of passage of cream through the tube upon depletion of the source of such cream to thereby effect discontinuance of operation of the pump associated with the depleted source and effecting automatic commencement of operation of another pump operably joined to a second source of the cream so that delivery of such cream to the coffee station is rendered continuous notwithstanding delivery of all of the cream from one of the sources to the coffee station; to the provision of novel clutch means for the individual pumps and connected to a common prime mover, with engagement of a particular clutch with a corresponding pump being determined by the light sensing means designed to detect cessation of flow of cream through the tube adjacent such sensing means whereby only one prime mover is required for operation of all of the pumps in the cream dispenser unit; to improved mechanism for coupling the single prime mover to a shiftable carriage having the cream tubes thereon, for shifting the carriage in a direction to extend the cream tubes out of the housing and into overlying relationship to the coffee cup at the coffee delivery station, and in timed sequence so that a predetermined amount of coffee is delivered into the coffee cup, whereupon the carriage is then returned to the innermost end of its path of travel within the refrigerated housing; to the provision of structure forming a part of the dispensing mechanism permitting the serviceman to prime the cream tubes after placement of the latter on the carriage means adapted to extend and retract such tubes into and out of the housing in response to the customer pushing a cream selector button on the front of the coffee vending machine; and to the provision of a cream dispensing unit which is designed so that the serviceman does not handle any components ultimately contacted by the cream, thereby resulting in a much more sanitary unit than those heretofore proposed. Other objects and details of construction of the present invention will become obvious or be explained in greater detail as the following specification progresses.

Figure 1:
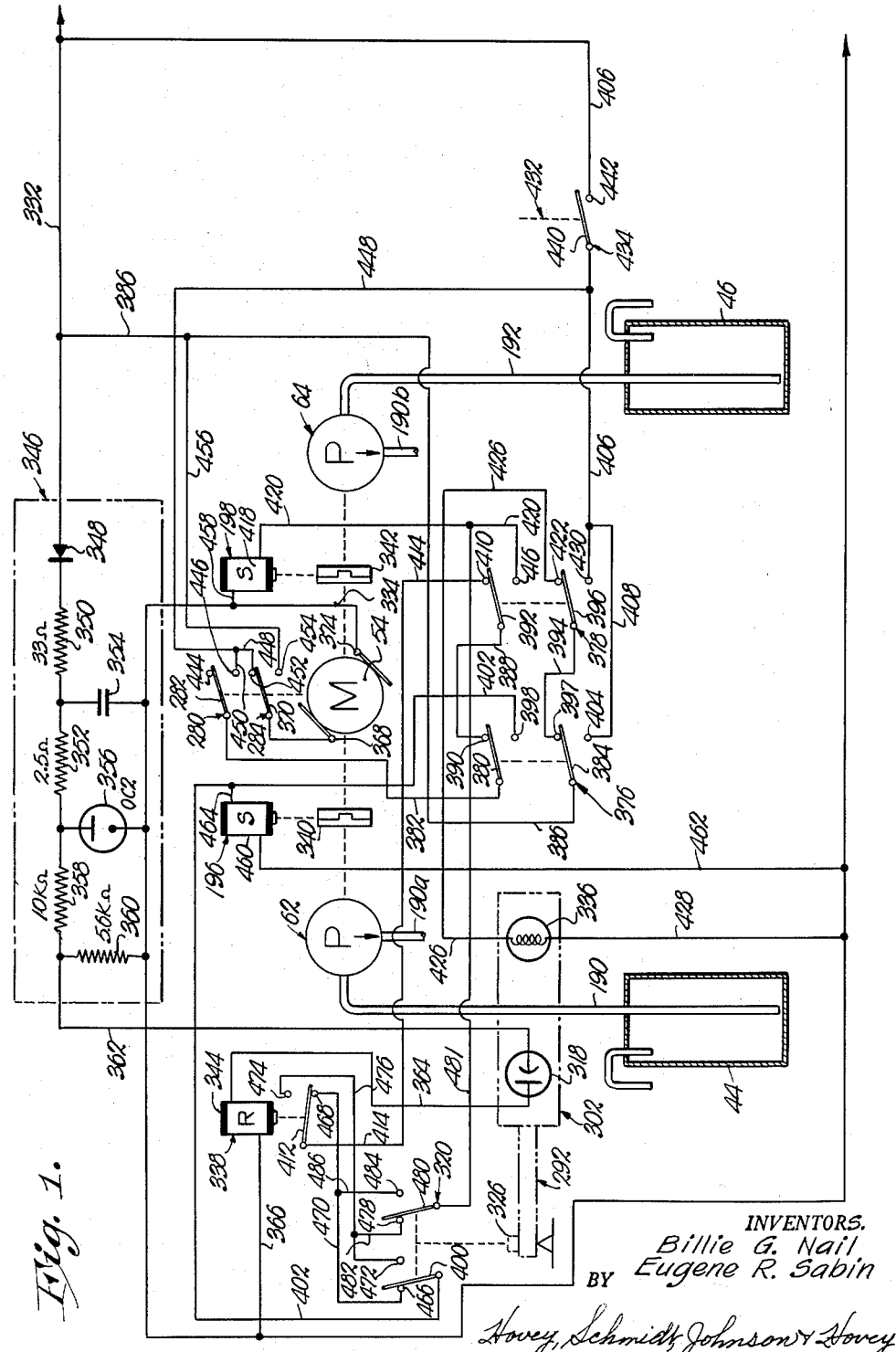
FIGURE 1 is a schematic representation of a cream dispensing unit embodying the preferred concepts of the present invention and showing the parts in their normal interrelationship, as well as the electrical components for effecting automatic operation of the cream dispenser.

The cream dispensing mechanism embodying the preferred principles of the present invention is broadly designated by the numeral 10 in the drawings and includes as basic components, an insulated housing or cabinet 12 provided with a refrigeration unit 14 on the upper extremity thereof and receiving a pump unit 16 within the interior thereof.

Cabinet 12 is constructed of relatively thick walls having insulation therein and including a bottom wall section 18, a top wall section 20 carrying refrigeration unit 14, opposed side walls sections 22 and 24 and a rear wall section 26, it being noted that the front of cabinet 12 is open, with rectangular door 28 being employed to normally close the front opening 30 in cabinet 12 defined by wall sections 18, 20, 22 and 24. Door 28 is provided with a central rectangular opening 32 therethrough in alignment with the lower portion of pump unit 16. A rectangular closure in the nature of a small door 34 is swingably mounted on an upright pin 36. Hinges 38 of door 34 are rotatably received by pin 36 while the latter is in turn carried by a pair of vertical, spaced lugs 40 projecting outwardly from the outer face of door 28. A coil spring 42 around pin 36 between hinges 38 and engaging the outer face of door 34 and door 28 respectively, normally biases door 34 into the disposition thereof closing opening 32.

Figure 2:
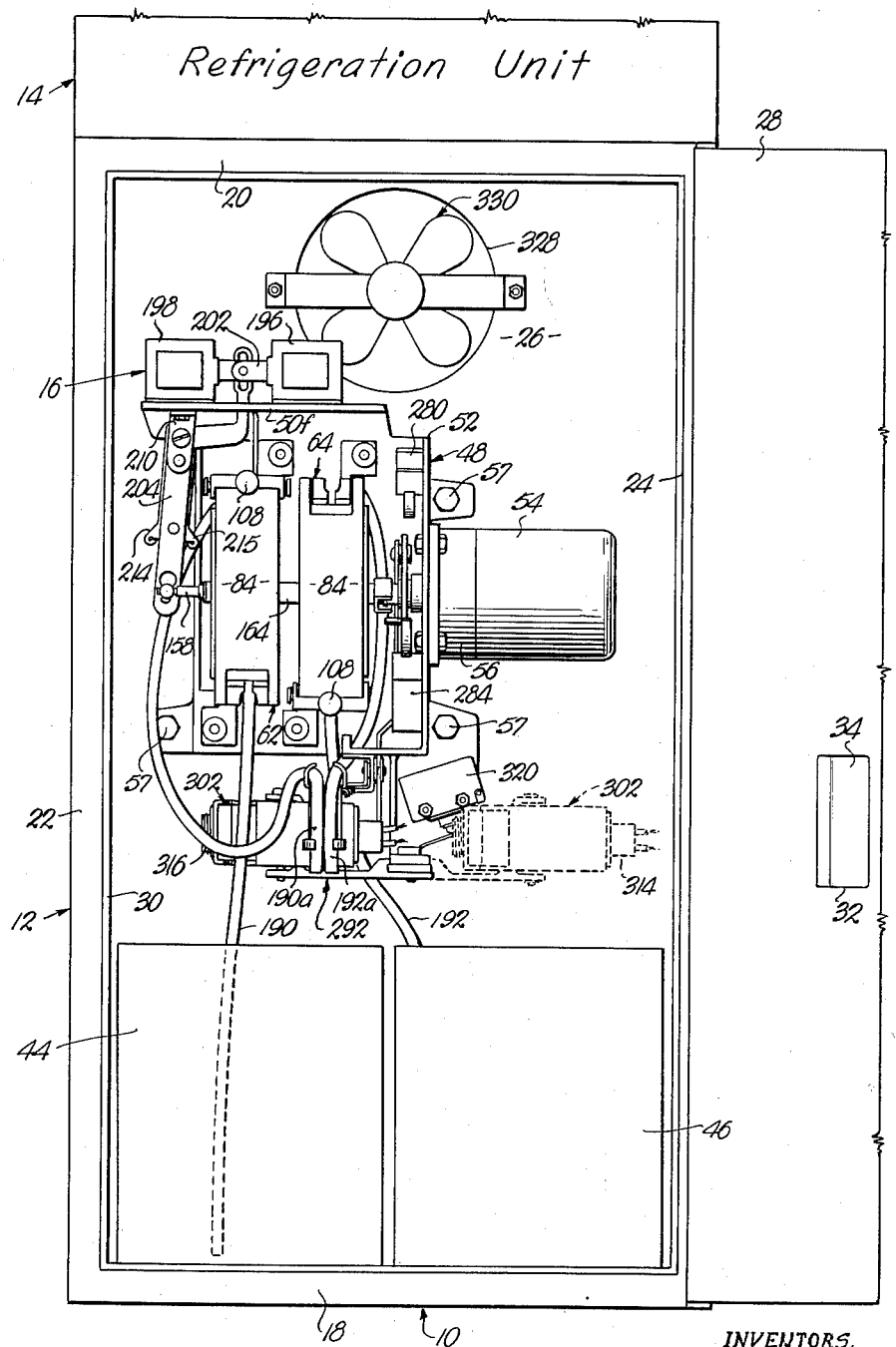
FIG. 2 is a fragmentary, front elevational view of the cream dispensing mechanism, with the door of the housing being illustrated in the open position thereof so that the cream pumping unit and its relationship to the cream receptacles may be seen, and with one of the positions of the depleted cream source sensing structure being illustrated by dotted lines.

As indicated in FIG. 2, the area of cabinet 12 immediately below pump unit 16 is adapted to receive a pair of cream containers 44 and 46 which may comprise glass or plastic bottles, wax impregnated cardboard cartons or similar receptacles which preferably are closed at the upper end thereof except for a tube-receiving opening in the upper extremity thereof, so that foreign materials cannot readily enter the interior of containers 44 and 46.

Figure 6:
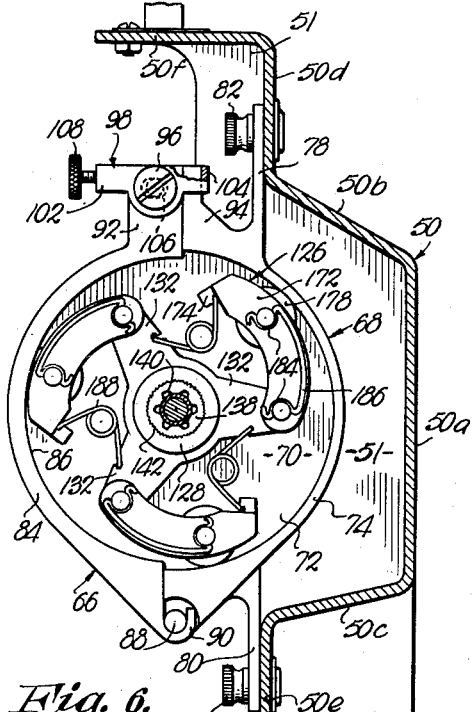
FIG. 6 is a vertical, cross-sectional view taken substantially on the irregular line 6—6 of FIG. 3 and looking in the direction of the arrows.

Bracket structure 48 for carrying the components of unit 16 is mounted on the innermost face of rear wall 26 and preferably comprises a casting having a rear wall 50 (FIG. 6) which is suitably secured to wall section 26 and is provided with a central rectangular section 50a extending substantially the full horizontal width of structure 48 and integral with outwardly projecting, angularly disposed sections 50b and 50c which in turn are integral with vertical segments 50d and 50e respectively lying in a common vertical plane. A shelf portion 50f integral with the upper margin of section 50d is in generally perpendicular relationship to the latter and is connected to end wall 51 disposed in a vertical plane as best shown in FIG. 6. A trapezoidal-shaped end wall 52 integral with rear wall 50 along the right-hand margin thereof viewing FIG. 2, serves as means for mounting a prime mover in the nature of an electric motor 54 which is secured to the outer face of end wall 52 and projecting outwardly therefrom, it being pointed out that a gear unit 56 interposed between the field windings and armature of motor 54 and the end wall 52, serves to provide an output shaft 58 and a power member 60 surrounding such shaft in coaxial relationship thereto and rotated by motor 54 at a different speed than the main shaft 58. Ears 53 and 55 projecting outwardly from the outer surfaces of end walls 51 and 52 respectively, with ear 53 being positioned adjacent the lower margin of end wall 55 and ear 54 being located proximal to the uppermost edge of end wall 52, serve as means for permitting bracket structure 48 to be firmly secured to the inner face of end wall section 26 through bolt means 57. An L-shaped bracket section 59 integral with the lower margin of rear wall 50 proximal to the zone of juncture thereof with end wall 52, also has an opening 61 in the upright segment 63 thereof for receiving another of the securing bolts 57.

A pair of pump units broadly designated 62 and 64 are carried by bracket structure 48 in positions to be operated by shaft 58 of gear unit 56. Each of the pump units 62 and 64 has a pair of hingedly interconnected sections 66 and 68 defining a hollow pump chamber 70 therewithin coaxial with shaft 58 and tubular member 60. Section 68 of each of the pumps 62 and 64 has a circular side wall 72 integral with an arcuate end wall section 74 having an inner semicylindrical surface 76 coaxial with shaft 58. Upwardly and downwardly projecting extensions 78 and 80 integral with each of the end walls 74 have openings (not shown) therein for clearing respective securing members 82 which are threaded into sections 50d and 50e respectively of rear wall 50. It can be seen that sections 68 of pump units 62 and 64 may thereby be removed from bracket structure 48 upon removal of securing members 82 from sections 50d and 50e.

The front portions of pump units 62 and 64 and defined by sections 66, comprise a semicylindrical end wall section 84 having an inner cylindrical surface 86 complemental with surface 76. The lower extremity of each of the end wall sections 74 is provided with a pair of outwardly projecting, horizontally disposed pins 88 adapted to receive hook segments 90 integral with the lower extremities of corresponding end wall sections 84, as best shown in FIG. 6. The upwardly extending segment 92 of each section 66 and integral with respective end wall sections 84, is adapted to complementally engage an upright projection 94 joined to the upper end of each of the end wall sections 74 in perpendicular relationship to proximal extensions 78. Screws 96 are threaded into opposed faces of upright segments 92 and clamps 98 are mounted on opposed screws 96 for securing the upper end of corresponding end wall sections 84 to proximal end wall sections 74. Each of the clamps 98 has a main bight segment 100 extending across the forwardmost face of each of the segments 92 and integral with parallel, rearwardly extending sections 102 which in turn are provided with relatively short terminal portions 104 which project toward each other in perpendicular relationship to sections 102. In order to permit clamps 98 to move relative to corresponding segments 92, sections 102 are provided with elongated slots 106 therein for cleaning respective screws 96.

Figure 3:
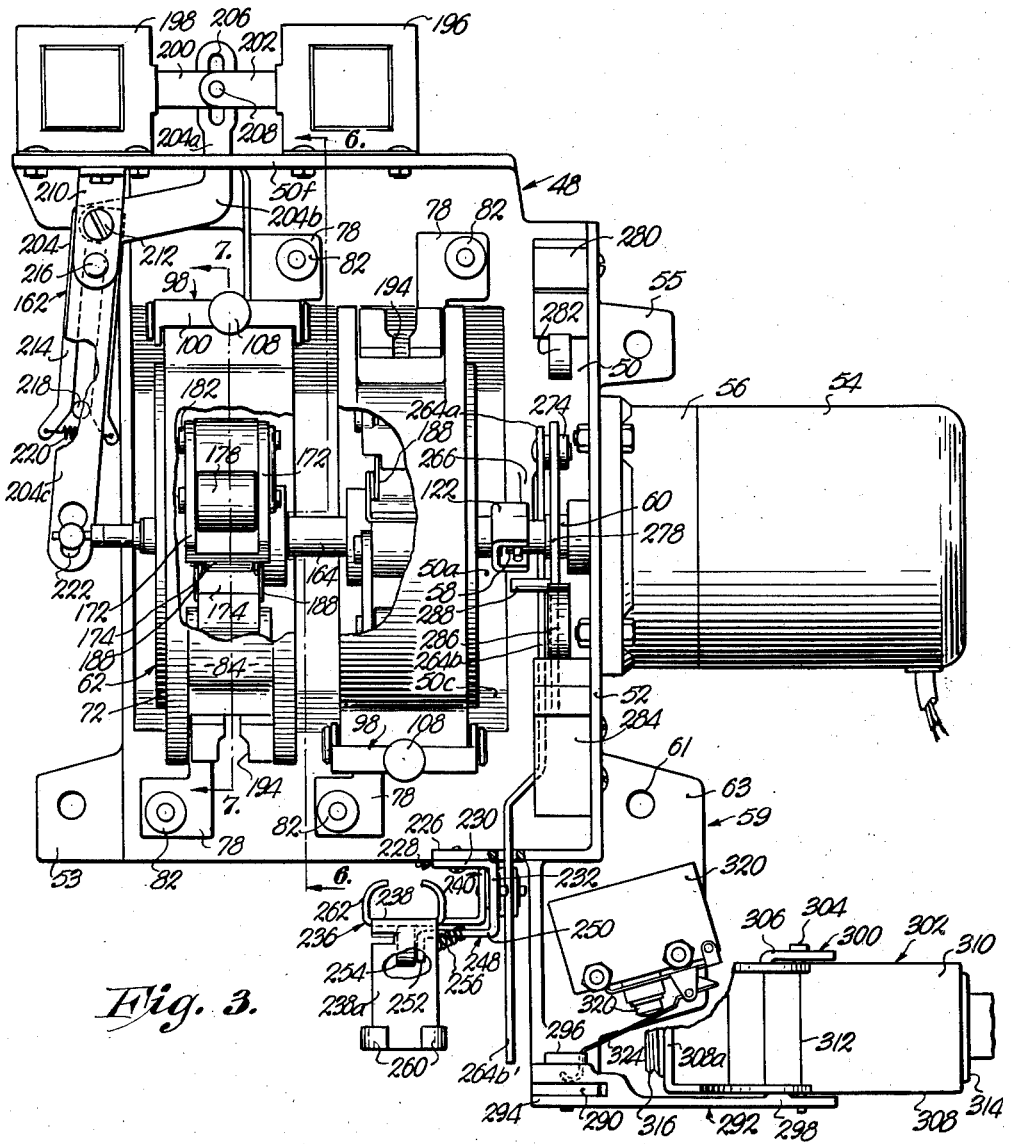
FIG. 3 is a front elevational view of the cream pumping mechanism per se with certain of the parts thereof being broken away to reveal details of construction of the elements therebehind.

A screw 108 having a knurled head thereon is threaded into the central portion of each of the bight sections 100 with each screw 108 being of sufficient length to permit the innermost end thereof to be received in corresponding recesses 109 in the outer faces of segments 92 when terminal portions 104 are in contacting engagement with the rear faces of projections 94. As illustrated in FIGS. 2 and 3, pumps 62 and 64 are reversed so that the hinge portions thereof presented by pins 88 and hooks 90 are disposed at opposite ends of bracket structure 48. For example, the clamp 98 of pump unit 62 is at the upper part of bracket structure 48 whereas clamp 98 of pump unit 64 is located adjacent the lower terminus of bracket structure 48.

In view of the reversed disposition of pump units 62 and 64, it can be seen that the side walls 72 thereof are positioned away from each other and thereby prevent entrance of objects into the interior of chambers 70 from opposed sides of pump units 62 and 64. Each of the side walls 72 has a central opening 110 therein which receives an elongated bearing sleeve 112 press fitted thereinto and projecting into the interior of chamber 70 of respective pump units 62 and 64. An elongated tubular clutch member 114 is rotatably carried by bearing sleeve 112 and extends completely through pump units 62 and 64 and projects outwardly from opposed outer faces of side walls 72. A generally U-shaped connector bracket 116 is secured to the extremity of clutch member 114, it being noted from FIGS. 3 and 4 that bracket 116 has a bight 118 provided with a central opening 120 therein receiving the end of tubular member 114, while outwardly projecting parallel legs 122 of bracket 116 overlie the proximal end of shaft 58. A pin 124 extending transversely through the outer end of shaft 58 is disposed to engage opposed legs 122 of bracket 116.

Figure 4:
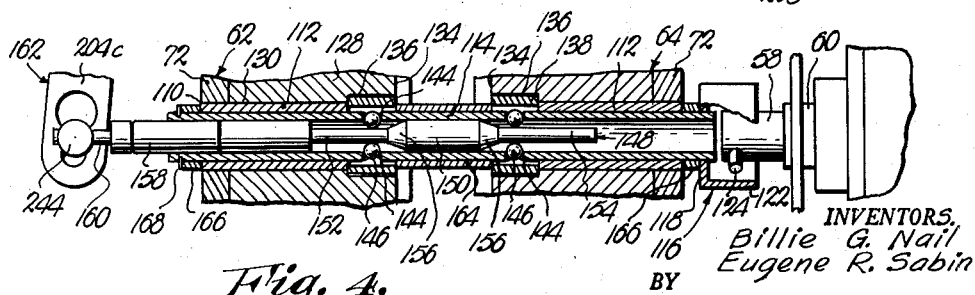
FIG. 4 is a fragmentary, vertical, cross-sectional view through the clutch structure for operably coupling the pumps to the single prime mover of the mechanism.

Each of the pump units 62 and 64 is provided with impeller means broadly numerated 126 and including a central hub member 128 provided with an elongated cylindrical passage 130 therethrough of a diameter substantially equal to the outer diameter of a corresponding bearing sleeve 112. As illustrated in FIG. 4, hub members 128 are rotatably carried by corresponding bearing sleeves 112 and have three outwardly projecting, radially disposed arms 132 located at relative angles of approximately 120°. The cylindrical faces 134 of hub members 128 and disposed in proximal opposed relationship, are provided with cylindrical recesses 136 therein coaxial with tubular member 114 and of slightly greater diameter than corresponding passages 130 therethrough. Splined clutch members 138 are press fitted in each of the recesses 136 and are provided with a plurality of splines 140 arranged circumferentially of the inner surface of corresponding splined clutches 138 and in parallel relationship to the axis of tubular member 114. The outer surface 142 of each of the splined clutches 138 is preferably knurled as indicated in FIG. 6, so as to preclude relative rotation between splined clutches 138 and respective hub members 128. Tubular member 114 has a pair of opposed openings 144 in alignment with each of the splined clutches 138 for clearing respective steel clutch balls 146 which are maintained in corresponding openings 144 by a clutch shaft broadly designated 148.

As best illustrated in FIG. 4, clutch shaft 148 has a central section 150 intermediate opposed pairs of balls 146 and of a diameter substantially equal to the internal diameter of tubular member 114. The sections 152 and 154 of shaft 148 on opposite sides of central section 150 are of substantially less diameter than that of section 150, with the outer surface of reduced diameter section 152 merging with the outer surface of central section 150 through beveled surfaces 156 disposed to engage corresponding proximal balls 146 and bias the latter outwardly through openings 144 as shaft 148 is reciprocated in tubular member 114. The outermost cylindrical section 158 of shaft 148 is of the same diameter as central section 150 and projects outwardly from tubular member 114 in a direction away from shaft 148. A reduced diameter terminal segment 160 connected to the outer extremity of section 158 facilitates connection of shaft 148 to clutch shaft shifting structure broadly designated 162 and carried by shelf 50f of wall 50. In order to maintain impeller means 126 of each of the pump units 62 and 64 in proper spaced relationship on tubular member 114, a cylindrical spacer 164 is provided between and in engagement with opposed faces of splined clutches 138, while annular spacers 166 are mounted on the outer extremities of tubular member 114 in abutting relationship to bearing sleeve 112. The spacer 166 proximal to side wall 72 of pump unit 64 is in abutting relationship to the outer face of bight 118, while a C-clip 168 or other equivalent means on the end of tubular member 114 proximal to structure 162 releasably maintains the adjacent spacer 166 in engagement with the outer face of side wall 72 of pump unit 62.

Roller units 170 swingably mounted on the outer extremities of each of the arms 132 include a unit comprised of a pair of longitudinally arcuate legs 172 interconnected by an outer bight section 174 remote from corresponding arms 132, elongated pins 176 extending through corresponding arms 132 and the proximal extremities of legs 172 serving to releasably mount the roller units 170 on a respective hub member 128. A roller 178 interposed between opposed legs 172 of each roller unit 170 and rotatable on corresponding pins 180 are disposed to engage the cylindrical surfaces of sections 66 and 68 defined by surfaces 76 and 86 respectively. Pins 176 and 180 are provided with enlarged heads 182 at one extremity thereof while the opposite ends of such pins have circumferentially extending grooves (not shown) therein for receiving the generally U-shaped segments 184 of spring clips 186. Springs 188 are interposed between each of the arms 132 and a proximal bight section 174 of roller units 170 for biasing the rollers 178 into firm engagement with the cylindrical surfaces of sections 66 and 68 of pump units 62 and 64.

Figure 7:
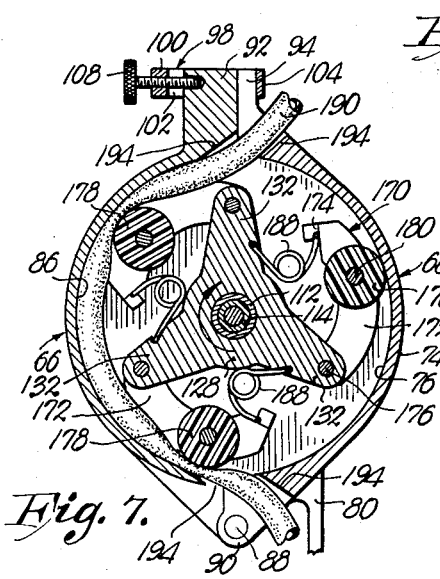
FIG. 7 is a vertical, cross-sectional view taken on the line 7—7 of FIG. 3 and illustrating the normal disposition of a cream delivery tube within the pump casing.
Figure 8:
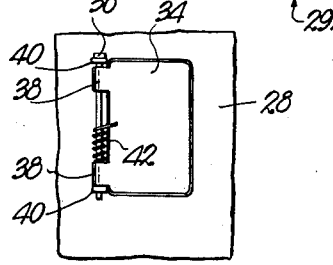
FIG. 8 is a fragmentary, front elevational view of a portion of the front door of the cream dispenser housing and showing in detail, the construction of the closure normally closing the opening in such door.

In order to permit placement of flexible tubes 190 and 192 in respective pump units 62 and 64 and leading from corresponding containers 44 and 46, sections 66 and 68 have circular notches 194 in the upper and lower extremities respectively for clearing such tubes, as best illustrated in FIG. 7.

Structure 162 includes a pair of solenoids 198 and 196 positioned so that the armature links 200 and 202 respectively are in facing overlapped relationship, as illustrated in FIG. 3, with such links being coupled to a generally Z-shaped lever 204. The upper segment 204a of lever 204 has an elongated, upright slot 206 clearing a connector pin 208 which extends through overlapped terminal portions of links 200 and 202. A bracket arm 210 depending from the underface of shelf 50f carries a pivot pin 212 which extends through lever 204 at the zone of juncture of sections 204b and 204c thereof. A pair of elongated generally L-shaped alignment strips 214 and 215 are pivotally connected by pin 212 and extend downwardly along the longitudinal length of section 204c of lever 204. An abutment pin 216 secured to the lower extremity of bracket arm 210 immediately below pin 212, extends between strips 214 and 215 and maintains the same in substantially parallel relationship as shown in FIG. 3. Section 204c of lever 204 also is provided with an abutment stop 218 thereon extending between strips 214 and 215 adjacent the lower extremities of the same. Spring 220 interconnecting the lower extremities of strips 214 and 215 bias the latter into normal engagement with pin 216 and stop 218. The lower end of section 204c of lever 204 has a keyhole-shaped slot 222 therein for receiving a connector 224 which is telescoped over the outer extremity of terminal segment 160 of shaft 148 and is secured to the latter so that upon swinging movement of section 204c of lever 204, shaft 148 is reciprocated in tubular member 114.

Figure 5:
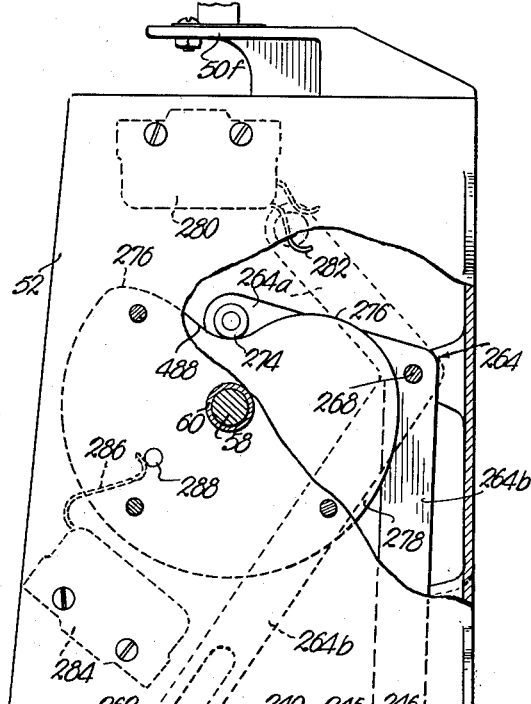
FIG. 5 is a side elevational view of the pump mechanism illustrated in FIG. 3 with portions thereof being broken away to show the components therebehind, and with one position of the cream tube carriage and the structure for shifting the latter into such position being illustrated in dotted lines.

Lower horizontal bracket portion 226 of structure 48 and integral with the lower margin of wall 52 as well as rear wall 50, carries a generally transversely L-shaped support member 228 having an elongated horizontal segment 230 riveted to the underside of bracket portion 226 adjacent the outer margin of the latter, while the elongated vertical segment 232 of support member 228 is provided with an elongated horizontal slot 234 therein extending substantially the full length of vertical segment 232. Tube carriage 236 mounted on support member 228 is provided with an elongated strip 238 disposed with the major length thereof parallel with horizontal segment 230 of support member 228, while the outermost terminal portion 238a of strip 238 is curved downwardly as best shown in FIGS. 3 and 5, to serve as a support for the delivery ends 190a and 192a of tubes 190 and 192 respectively. An integral, upstanding flange 240, integral with the margin of strip 238 proximal to vertical portion 232 of support member 228, carries a pair of outwardly projecting pins 242 and 244 which extend through slot 234 and are held in place by suitable securing means such as C-clips or the like, with washers 246 being interposed between respective clips and the outer face of vertical portion 232 of support member 228.

In order to provide a support for carriage 236, support member 228 has a generally L-shaped tab 248 integral with the lower margin of upright portion 232 of support member 228 and including a horizontal section 250 as well as an outer vertical section 252 depending from horizontal section 250 and remote from upright portion 232. A roller 254 is rotatably mounted on section 252 in a position to engage the lower face of strip 238 and thereby support carriage 236. Coil spring 256 connected to a tab 258 on the underface of strip 238 adjacent the zone of merger of outer terminal portion 238a thereof with the horizontal main portion of strip 238, and the horizontal section 250 of support member 228, biases carriage 236 toward the innermost end of its path of travel as illustrated in FIG. 5.

In order to maintain the delivery ends 190a and 192a of tubes 190 and 192 in predetermined disposition on carriage 236, strip 238 is provided with two pairs of opposed, substantially J-shaped hooks 260 and 262 integral with corresponding opposed side margins of strip 238. As illustrated in FIG. 5, the inwardly curved hooks 260 are on the outermost extremity of curved portion 238a of strip 238, while hooks 262 are located on the major horizontal portion of strip 238 adjacent the point where strip 238 commences to curve downwardly. In this manner, the delivery ends 190a and 192a of tubes 190 and 192 respectively may be positioned under the hooks 260 and 262 and inasmuch as the space between the adjacent ends of hooks 260 and 262 is only approximately equal to the diameter of one of such tubes, the same are maintained in place under the corresponding hooks and will not become displaced therefrom until the serviceman removes one of the tubes from under corresponding hooks.

In order to shift carriage 236 along its path of travel to an extended position as illustrated by the dotted lines in FIG. 5, a generally L-shaped lever 264 is pivotally mounted on an outwardly projecting boss 266 extending outwardly from the face of rear wall 50, with pivot pin 268 carried by boss 266 and extending through lever 264 at the zone of juncture of the legs 264a and 264b thereof, permitting swinging movement of lever 264 about the axis of pin 268. Leg 264b of lever 264 has a dogleg therein intermediate the ends of the same as illustrated in FIG. 3, for causing the lower section 264b' of lever 264 to be in close proximity to the outer face of upright portion 232 of support member 228. Lower section 264b' of lever 264 has an elongated, upright slot 270 therein which receives pin 244 and with washer 246 being positioned externally of lever 264. It is to be preferred that a washer 272 also be provided between the outer face of upright portion 232 of support member 228 and the opposed face of section 264b' of lever 264.

Means for swinging lever 264 about the axis of pin 268 includes a follower 274 rotatably mounted on the outer end of leg 264a of lever 264 and engaging the outer cam surface 276 of a cam 278 carried by power member 60 of gear unit 56.

A cream start switch 280 is secured to the inner face of end wall 52 adjacent the upper margin thereof and has a switch arm 282 disposed to be engaged and shifted by the upper extremity of leg 264a of lever 264 upon swinging movement of the latter to the dotted line disposition of the same illustrated in FIG. 5. A motor switch 284 is also carried by the inner face of wall 52 below motor 54 and has an upwardly facing switch arm 286 located in a disposition to be engaged and shifted by an outwardly extending pin 288 carried by cam 278 in spaced relationship to the axis of shaft 58.

Bracket structure 59 is provided with an outwardly projecting integral lug 290 on the lower extremity thereof and serving as means for mounting a swingable bracket arm broadly designated 292. Opposed, vertically spaced legs 294 of bracket arm 292 and receiving lug 290 therebetween are connected to the latter by screw means 296 extending through legs 294 and lug 290 and permitting arm 292 to rotate relative to lug 290 about the axis of screw 296. The main leg 298 of arm 292 has a generally L-shaped, upstanding support element 300 on the outer end thereof adapted to receive an outwardly extending lug portion (not shown) of photoelectric cell unit 302 pivotally carried by arm 292 by virtue of pivot pin 304 extending through the upper leg section 306 of support element 300, the rear lug of unit 302 and the outer extremity of leg 298. Unit 302 includes a generally rectangular housing 308 normally open at the front thereof and partially closed with a removable front plate 310 which has a side margin 312 in spaced relationship to side wall portion 308a of housing 308 to thereby present a recess in housing 308 for clearing one of the tubes 190 or 192 as indicated in FIG. 2. A bulb receptacle 314 is carried by the extremity of housing 308 remote from side margin 312 of plate 310, while a socket 316 is provided at the opposite end of housing 308 for mounting a suitable light sensitive device in the nature of a photoelectric cell 318 or equivalent means, as for example a light dependent resistor.

A polarizing switch 320 mounted on the outer face of segment 63 has a switch pin 322 extending downwardly therefrom and disposed to be operated by a swingable switch arm 324 which extends downwardly into disposition to be engaged by upwardly projecting cam 326 on the forwardmost edge of upper leg 294 of arm 292 when unit 302 is in the right-hand position of the same as indicated in FIG. 3.

Refrigeration unit 14 communicates with the interior of cabinet 12 through an opening 328 in rear wall 26, while fan means 330 is positioned in opening 328 for circulating the air from the interior of cabinet 12 over the evaporator of refrigeration unit 14.

The electrical components and the circuitry therefor are illustrated schematically in FIG. 1, with the main power lines being designated 332 and 334. Photoelectric cell 318, which is disposed to receive rays of light from electric light bulb 336 in socket 314, provided such rays of light may pass through the tube 190 or tube 192, is operably connected to a relay 338 which controls energization of solenoids 196 and 198 in turn connected to the clutch for coupling motor 54 to respective pump units 62 and 64. For clarity, two clutches are indicated schematically in FIG. 1. The clutch 340 is interposed between motor 54 and pump 62 while clutch 342 joins pump 64 to motor 54. It is to be understood however, that the clutches 340 and 342 are embodied in one integrated unit as illustrated in detail in FIGS. 3 and 4 of the drawings.

In order to provide a source of filtered direct current for the series circuit including coil 344 of relay 338 and the photoelectric cell 318, whose variable resistance characteristics control the operation of the relay 338, a rectifying, filtering and voltage regulating unit generally designated 346 is provided. Unit 346 includes a rectifier device 348 which may be of the dry disc or diode type, coupled in series with A.C. power lead 332. A pair of resistors 350 and 352 coupled in series with the side of rectifier 348 opposite its connection with power line 332 and a capacitor 354 coupled in shunt between A.C. power line 334 and the interconnection between resistors 350 and 352, serves as a ripple filter.

A voltage regulator device 356 which may be of the gaseous discharge type, coupled between power lead 334 and the extremity of resistor 352 remote from the power line 332, serves to maintain a substantially constant voltage across its terminations. Resistors 358 and 360 coupled in series with each other and in shunt across the terminals of the voltage regulator device 356, serve to provide a load resistance and to perform a voltage dividing function so that an appropriate voltage may be coupled by line 362 to one side of the photoelectric cell 318, whose opposite side is coupled through line 364 with one termination of coil 344 of relay 338, the opposite termination of coil 344 being connected by lead 366 with power lead 334 which also serves as the ground for the direct current rectifying and filtering unit 346.

One terminal 368 of motor 54 is connected to the switch arm 370 of motor switch 284 by a line 372 while the other terminal 374 of motor 54 is coupled directly to power line 334. The control circuitry also includes manually operable priming switches 376 and 378 for the pumps 62 and 64 respectively. The priming switches 376 and 378 are preferably of the double pole, double throw type and the switch arm 380 of switch 376 is connected to the switch arm 382 of cream start switch 280 by a lead 382. The other switch arm 384 of switch 376 is joined directly to power lead 332 by line 386. Line 388 interconnects the contact 390 of switch 376 associated with switch arm 380, with the switch arm 392 of switch 378. Another line 394 joins the contact 397 of switch 376 associated with switch arm 384, to the switch arm 396 of switch 378. The contact of switch 376 opposed to contact 398 is connected to the switch arm 400 of polarizing switch 320 by a lead 402. The other contact 404 of switch 376 opposed to contact 397 is connected to a line 406 by lead 408.

The upper contact 410 associated with switch arm 392 of switch 378 is joined to relay switch arm 412 of relay 338 by a line 414. The contact 416 of switch 378 opposed to contact 410 is joined to the coil 418 of solenoid 198 by line 420. The upper contact 422 of switch 378 associated with switch arm 396 is coupled to the filament 424 of bulb 336 by a line 426. Lead 428 joins the opposite terminal of filament 424 to power lead 334. The lower contact 430 of switch 378 associated with switch arm 396 is joined to power lead 332 by line 406, it being noted that a cam operated cup dropper switch 434 is interposed in line 406. The structure for changing the position of switch arm 440 of switch 434 is indicated by the dotted line 432 and includes a cam which is operated by the cup dropper motor forming a part of the coffee machine. Switch arm 440 is disposed to engage a contact 442 in line 406.

The upper contact 444 of switch 280 is open while the opposed contact 446 thereof is joined to line 448 by lead 450, it being apparent that line 448 joins the contact 452 of switch 284 to line 406 between switch 434 and switch 378. The lower contact 454 of switch 284 is connected to power line 332 through line 456 which joins line 386 in turn connected to line 332.

The coil 418 of solenoid 198 is also coupled to power lead 334 by line 458 while the coil 460 of solenoid 196 is coupled to power lead 334 through line 462. The other terminal of coil 460 of solenoid 196 is joined to line 402 by lead 464.

The contact 466 of polarizing switch 320 associated with switch arm 400, is joined to contact 468 of relay 338, by a line 470, while the contact 472 of polarizing switch 320 opposed to contact 466, is coupled to the other contact 474 of relay 338, by line 476. The contact 478 of switch 320 associated with switch arm 480 thereof is joined to line 476 by lead 482. The remaining contact 484 of polarizing switch 320 is joined directly to line 470 by a lead 486.

Operation

The condition of all of the switches and the relay are illustrated in the schematic representation in FIG. 1 in stand-by condition awaiting actuation of the cream dispenser mechanism by a customer. In order to place dispenser unit 10 in condition for dispensing of predetermined quantities of fresh cream into a freshly prepared cup of coffee disposed at a delivery station in the coffee vending machine, the serviceman initially opens door 28 to provide access to the interior of cabinet 12 whereupon two full cartons 44 and 46 of fresh cream are placed in the lower part of cabinet 12 on bottom wall section 18 immediately beneath pump unit 16 as illustrated in FIG. 2. Tubes 190 and 192 are inserted into receptacles 44 and 46 through the openings in the upper ends thereof and with the lower extremities of the tubes being shifted downwardly into positions adjacent the bottoms of corresponding receptacles 44 and 46 to assure removal of all of the cream from each of the containers.

Photoelectric cell unit 302 is shifted into the full line position indicated in FIG. 2 and the proximal stretch of tube 190 inserted in vertical notch in the front of housing 308 so as to be directly in the path of light rays passing from bulb 336 to photoelectric cell 318. In this respect, it is to be noted that the tubes 190 and 192 are preferably of transparent or translucent material so that when cream is passing through a corresponding tube, the cream blocks the light rays passing from lamp 336 toward photoelectric cell 318, but upon cessation of flow of such cream through the tube, the latter will transmit the light rays, thereby activating photoelectric cell 318.

The screws 108 of clamps 98 are rotated in directions to shift the threaded portions thereof out of corresponding recesses 109 in segments 92 to thereby permit sections 102 to be rotated about the axes of corresponding screws 96 and shift terminal portions 104 of clamps 98 into dispositions clearing corresponding projections 94 on pump units 62 and 64. Thus, the end wall section 84 of pump unit 62 may be swung downwardly about the axes of pins 88 on the corresponding end wall section 68 and the end wall section 84 of pump unit 64 may be swung upwardly in the same manner. The tubes 190 and 192 are then threaded through the notches 194 at the upper and lower ends of respective impeller means 126 in pump units 62 and 64 and with the tubes 190 and 192 in engagement with the outwardly facing rollers 178 of corresponding impeller means 126. Sections 84 of pump units 62 and 64 are then returned to their closed positions and clamps 98 hooked around projections 94 to maintain end wall sections 84 in closed disposition upon tightening of respective screws 108. As best shown in FIG. 7, closing of pump units 62 and 64 causes the portions of tubes 190 and 192 within corresponding pump units 62 and 64 to be compressed between rollers 178 and the semicylindrical surface 86 of respective sections 84.

The free ends of tubes 190 and 192 projecting from the tops of pump units 62 and 64, as indicated in FIG. 2, are then placed in carriage 236 beneath hooks 260 and 262 as described above, and with the terminal ends 190a and 192a of such tubes being located adjacent the extremity 238a of strip 238.

The serviceman then primes each of the tubes 190 and 192 by successively operating manual switches 376 and 378. For example, when switch arms 380 and 384 are manually shifted into disposition engaging contacts 398 and 404 respectively, motor 54 is actuated through a circuit including power lead 332, line 386, switch arm 384 of switch 376, contact 404, lead 408, line 406, line 448, contact 452, switch arm 370 of motor switch 284, line 372, the field windings of motor 54, contact 374 and main power line 334. It can be seen that upon shifting of switch arm 384 of switch 376 into engagement with contact 404, the circuit to lamp filament 424 is broken by virtue of interruption of flow of current through line 386 to line 394 upon shifting of switch arm 384 into engagement with contact 404. This insures that the relay 338 will remain in a deenergized condition and with the arm 412 thereof in engagement with contact 468.

Energization of motor 54 in accordance with the circuit just described, results in rotation of shaft 58 as well as power drive member 60. During rotation of member 60, the cam 278 is driven therewith, thereby causing follower 274 on lever 264 to follow the cam surface 276 of cam 278 and thereby effecting swinging movement of lever 264 about the axis of pin 268. As follower 274 is shifted outwardly from the disposition thereof illustrated in FIG. 5 toward the dotted line position of such lever, under the influence of the surface 276 of cam 278, the carriage 236 is moved outwardly from pump unit 16 along a rectilinear path of travel defined by the elongated slot 234 in vertical segment 232 of support member 228. Carriage 236 is shifted toward the left viewing FIG. 5 during swinging movement of lever 264 inasmuch as pin 244 carried by flange 240 of carriage 236 is within slot 270 of lower section 264b' of lever 264 whereby the latter forces pin 244 and thereby carriage 236 toward the left against the influence of coil spring 256. It can be seen that the slot 234 in vertical segment 232 cooperates with the roller 254 engaging the underside of strip 238, to limit the latter to a substantially rectilinear path of travel. Although closure 34 in door 28 is now out of the way because of door 28 being open, it is to be pointed out that carriage 236 is in direct alignment with closure 34 to normally open the same during dispensing of cream into a cup of coffee, as will be hereinafter outlined.

It is also apparent that the cream start switch 280 and motor switch 284 are in circuit with manually operable priming switch 376 so that when cam 278 has rotated through a sufficient arc to swing lever 264 to the end of its path of travel to the left as illustrated by dotted lines in FIG. 5, the upper extremity of leg 264a of lever 264 engages switch arm 282 of cream start switch 280 to thereby shift the switch arm 282 into engagement with contact 446. In this maner, solenoid 196 is energized through a circuit including power lead 332, line 386, switch arm 384 of switch 376, contact 404, lead 408, line 406, line 448, lead 450, contact 446, switch arm 282 of cream start switch 280, lead 382, switch arm 380 of switch 376, which is ganged with switch arm 384, contact 398, lead 402, lead 464, the coil 460 of solenoid 196, line 462 and power lead 334. Energization of the coil 460 of solenoid 196 causes the clutch denoted by the number 340 to close thereby coupling motor 54 to pump 62. The actual structural connection may be best understood when it is explained that energization of coil 460 causes link 202 to be shifted to the right, thereby rotating lever 204 in a clockwise direction by virtue of pin 208 acting on the upper segment 204a of lever 204 as pin 208 slides in the slot 206. During clockwise movement of lever 204, the lower segment 204c thereof moves to the left viewing FIG. 3, whereby clutch shaft 148 is shifted to the left and away from motor 54 and the beveled surface 156 of shaft 148 contacts balls 146, thereby biasing the latter outwardly through corresponding openings 144 in tubular clutch member 114 whereby balls 146 associated with the hub member 128 of pump 62 are moved into opposed splines 140 in splined clutch member 138 and thereby locking the corresponding hub member 128 to tubular member 114. It is to be remembered that rotation of shaft 58 by motor 54 and at a substantially higher speed than that of power member 60 causes tubular member 114 to be rotated by virtue of pin 124 extending through shaft 58, engaging legs 122 of connector bracket 116 to thereby rotate member 114 at the same speed as shaft 58.

As the hub member 128 is rotated by motor 54, the rollers 178 biased toward the cylindrical surfaces 76 and 86 of end wall sections 68 and 66, pump cream from container 44 into the tube 190 by virtue of impeller unit 126 of pump unit 62 producing a vacuum in tube 190 whereby cream is pumped up into the same.

As soon as the cam 278 has been rotated substantially 360°, the follower 274 is again permitted to move into the depressed section 488 of surface 276 whereby lever 264 is swung in a counterclockwise direction and returning carriage 236 to the innermost end of its path of travel under the influence of spring 256. During return movement of carriage 236, the switch arm 282 of cream start switch 280 is released, thereby breaking the circuit to solenoid 196 and effecting disconnection of pump unit 62 from shaft 58 of motor 54. It can be recognized that upon deenergization of the coil 460 of solenoid 196, the link 202 is permitted to return to the initial position thereof as illustrated in FIG. 3. Return of lever 204 to the initial disposition thereof is accomplished by coil spring 220 interconecting strips 214 and 215. Inasmuch as spring 220 is joined to the lower extremities of strips 214 and 215 and therefore biases the latter toward each other, it can be seen that the same tend to remain in engagement with abutment pin 216 on bracket arm 210. However, upon counterclockwise movement of lever 204 upon energization of the coil 460 of solenoid 196 as outlined above, the lower section 204c of lever 204 is shifted to the left viewing FIG. 3, whereby the abutment stop 218 on lever 204 engages the inner edge of strip 214 thereby shifting the latter along with lower section 204c of lever 204 and against the coil spring 220 interconnecting strips 214 and 215. Movement of strip 215 to the left is prevented by stop 216, thus causing spring 220 to be extended. Upon deenergization of solenoid 196, the spring 220 returns strip 214 into disposition engaging stops 216 and 218 whereby lever 204 is rotated in a counterclockwise direction and returning clutch shaft 148 to the original disposition thereof between opposed balls 146. Inasmuch as the beveled surface 156 of shaft 148 moves out of engagement of the left-hand balls viewing FIG. 4, the latter are permitted to move out of the splines 140 in clutch member 138 of pump unit 62 and with balls 146 returning into recessed relationship in the tubular member 114 whereby shaft 58 is disconnected from the impeller means 126 of pump unit 62. Thus, the pump unit 62 discontinues pumping of cream upon return of carriage 236 to the innermost end of its path of travel and thereby prevents dispensing of cream into the interior of cabinet 12. The motor 54 continues to operate as long as switch 376 is in the condition thereof indicated above with switch arm 380 engaging contact 398 and switch arm 384 engaging contact 404. However, cream will not be dispensed from tube 190 until carriage 236 has been extended to the dotted line disposition thereof as illustrated in FIG. 5. When the cream priming switch 376 is released, the circuit to the pump solenoid 196 is also broken by virtue of movement of arm 380 out of engagement with contact 398, and thus pumping will be discontinued regardless of the disposition of carriage 236. The pump motor 54 is then returned to stand-by position because of opening of switch 284.

The tube 192 is primed in the same manner by virtue of shifting of arm 392 into engagement with contact 416 and arm 396 into engagement with contact 430. In each instance, shifting of the arms of switches 376 and 378 into engagement with their lower contacts, causes the circuit to lamp 336 to be broken, thereby assuring deenergization of the coil 344 of relay 338.

The motor is energized upon closing of switch 378 through a circuit includng power line 332, line 386, switch arm 384 of switch 376, line 394, switch arm 396 of switch 378, contact 430, line 406, line 448, contact 452, switch arm 370 of motor switch 284, line 372, the terminal 368 of motor 54, the field windings of motor 54, terminal 374, and power line 334. Energization of motor 54 causes the cam 278 to be rotated in a manner as outlined above and it can be seen that shifting of arm 370 of motor switch 284 into engagement with contact 454 causes the motor to be energized from power line 332 directly through line 386 and line 456. As soon as the carriage 236 has been shifted to the outermost end of its path of travel by lever 264 actuated by cam 278, the cream start switch 280 is actuated, thereby shifting switch arm 282 into engagement with contact 446. This causes the coil 418 of solenoid 198 to be actuated through a circuit traced by line 332, line 386, switch arm 384 of switch 376, line 394, switch arm 396 to switch 378, contact 430, line 406, line 448, contact 446, switch arm 282 of switch 280, lead 382, switch arm 380 of switch 376, contact 390, line 388, switch arm 392 of switch 378, contact 416, line 420, the coil 418 of solenoid 198, line 458 and power line 334.

Lever 204 is rotated in a counterclockwise direction upon energization of solenoid 198 whereby shaft 148 is shifted inwardly under the influence of swinging movement of the lower section 204c of lever 204, with beveled surface 156 moving into engagement with the proximal balls 146 to shift the latter outwardly through respective openings 144 and into the splines 140 of the hub member 128 forming a part of the impeller means 126 in pump unit 64. Thus, the impeller means 126 of pump unit 64 is operably coupled to tubular member 114 which is in turn rotated by shaft 58 and effecting pumping of cream from container 46 into tube 192.

The serviceman then closes door 28 upon return of priming switches 376 and 378 to the disposition thereof illustrated in FIG. 1 and assuring that carriage 236 has been returned to the innermost end of the path of travel thereof, with follower 274 positioned in depressed section 488 of surface 276 on cam 278. Furthermore, the photoelectric cell unit 302 is in the left-hand position of the same with tube 190 passing therethrough and thus, the polarizing switch 320 is in the condition illustrated in FIG. 1.

Upon closing of a selector switch by a customer desiring cream in the cup of coffee freshly prepared by the coffee vending machine, the cup dropping mechanism forming a part of the unit is actuated which in turn results in closing of cup dropper switch 434 through connecting structure 432, with switch arm 440 moving into engagement with contact 442. Thus a circuit is completed from power lead 332 through line 406 to line 448 and thence through contact 452, switch arm 370 of motor switch 284, line 372, terminal 368, the windings of motor 54, terminal 374 and finally power line 334. Operation of motor 54 causes shaft 58 to be rotated as previously described and in conjunction with rotation of power member 60. As cam 278 is rotated by power member 60, the lever 264 commences swinging movement in a clockwise direction as previously described to extend carriage 236 carrying the outer extremities 190a and 192a of tubes 190 and 192 respectively.

Movement of cam 278 causes pin 288 thereon to move out of engagement with motor switch arm 286 whereby switch arm 370 of motor switch 284 shifts into engagement with contact 454. Motor 54 is thereby placed in circuit with lines 332 and 334 in by-passing relationship to line 406 having switch 434 therein. Thus, when cup dropping cam structure 432 releases switch 434 to permit arm 440 to move out of engagement with contact 442, motor 54 continues to operate through a full cycle. As soon as the lever 264 has been swung through the entire arc thereof to cause the uppermost end of leg 264a of lever 264 to engage switch arm 282 of cream start switch 280, switch arm 282 is moved into engagement with contact 446 whereby the coil 460 of solenoid 196 is actuated through a circuit traced by power lead 332, line 406 including closed switch 434, line 448, lead 450, contact 446, switch arm 282 of switch 280, lead 382, switch arm 380 of switch 376, contact 390, line 388, switch arm 392 of switch 378, contact 410, line 414, switch arm 412 of relay 338, contact 468, line 470, contact 466 of polarizing switch 320, switch arm 400 of switch 320, lead 402, lead 464, coil 460 of solenoid 196, line 462 and power line 334. Energization of solenoid 196 effects connection of shaft 58 of gear unit 56 to the impeller means 126 of pump unit 62 in a manner as described above, wherein lever 204 is shifted in a clockwise direction to reciprocate shaft 148 in a direction to bias the balls 146 adjacent beveled surface 156, through corresponding openings 144 in member 114 and into splines 140 of clutch member 138 carried by the hub member 128 of impeller means 126 on pump unit 62. Rotation of the respective impeller means 126 causes liquid to be pumped from container 44 through tube 190 for ultimate discharge through the end 190a thereof. It is to be remembered that carriage 236 has been shifted to the outermost end of its path of travel and that during such shifting movement, the outer surfaces of hooks 260 on strip 238 engage the inner surface of closure 34 thereby pushing the latter open against the action of coil spring 42 and with the outer end of carriage 236 thereby projecting outwardly from door 28. The extremities of tubes 190 and 192 are disposed in overlying relationship to the freshly prepared cup of coffee so that the cream is dispensed directly into the cup of coffee during the time that carriage 236 remains extended.

The amount of cream delivered to the cup of coffee during each cycle of operation of dispenser 10 is determined by the cup dropping mechanism operably coupled to switch 434 through structure 432. After a predetermined amount of cream has been delivered to the coffee station and while the carriage 236 is still in the extended position thereof, structure 432 shifts switch arm 440 out of engagement with contact 442 thereby discontinuing flow of current through line 406 and effecting deenergization of solenoid 196.

Deactivation of solenoid 196 causes impeller means 126 in pump unit 62 to discontinue rotational movement by virtue of the fact that hub member 128 is disconnected from tubular member 114. Motor 54 continues to operate however, until the pin 288 engages switch arm 286 to shift arm 370 into engagement with contact 452. It is to be noted that the cup dropper cam switch 434 is released at this time to place motor 54 in a deactivated condition. The pump clutch shaft 148 is returned to the initial disposition thereof by spring 220 in the same manner described in detail above with respect to priming of the tubes 190 and 192 and therefore, the cream dispenser mechanism 10 is in condition for dispensing of another predetermined amount of cream upon customer operation of one of the selector switches on the coffee machine.

The cyclic operation described above continues until the container 44 is emptied of cream whereupon the relay 338 is energized to change the disposition of switch arm 412. It can be seen that light 336 remains energized at all times during normal operation of the cream dispenser through a circuit including power lead 332, line 386, switch arm 384 of switch 376, contact 397, line 394, switch arm 396 of switch 378, contact 422, line 426, the filament 424 of lamp 336, lead 428 and power line 334. As soon as the tube 190 is emptied of cream, the rays of light from filament 424 are permitted to pass through transparent tube 190 and onto photoelectric cell 318, thereby activating the latter to permit current to pass from filtering unit 346 via line 362, cell 318 and line 364 to the coil 344 of relay 338 and thence lead 366 to power line 334. Energization of coil 344 causes the switch arm 412 of relay 338 to be shifted into engagement with contact 474. Under this condition, the next cyclic operation of mechanism 10 causes solenoid 198 to be energized in lieu of solenoid 196 because the circuit from cream start switch 280 now includes lead 382, switch arm 380 of switch 376, contact 390, line 388, switch arm 392 of switch 378, contact 410, line 414, switch arm 412 of relay 338, contact 474, line 476, lead 482, contact 478 of polarizing switch 320, switch arm 480 of polarizing switch 320, line 481, line 420, the coil 418 of solenoid 198, line 458, and power line 334.

Shaft 148 is moved to the right viewing FIG. 4, upon actuation of solenoid 198 and with lever 204 being shifted in a counterclockwise direction in response to retraction of link 200 into the coil 418 of solenoid 198. Thus, the balls 146 associated with beveled surface 156 of shaft 148 are forced through corresponding openings 144 in tubular member 114 upon shifting of shaft 148 to the right, whereby the impeller means 126 of pump unit 64 is actuated to cause cream to be pumped from container 46 through tube 192 to the freshly prepared cup of coffee at the coffee delivery station. The actuation of motor 54 and the opening and closing of cream start switch 280 and motor switch 284 is identical with that described above to effect dispensing of a predetermined quantity of cream from container 46 and with the motor then being automatically deactivated and all of the components being returned to their initial disposition at the conclusion of a cream dispensing cycle.

Spring 220 cooperates with strips 214 and 215 to return shaft 148 to the neutral position thereof upon deactivation of solenoid 198. Counterclockwise movement of the lower part of lever 204 causes strip 215 to be swung therewith by virtue of engagement of strip 215 with the abutment stop 218 carried by lever 204. Similarly, the strip 214 remains in the initial position thereof engaging abutment pin 216 so that stretching of spring 220 causes the latter to return strip 215 and lever 204 to the initial positions thereof as soon as solenoid 198 is deactivated. It can therefore be appreciated that strips 214 and 215 as well as spring 220 cooperate to maintain clutch shaft 148 in the neutral position of the same after lever 204 has been swung in one direction or the other upon energization of solenoids 196 or 198 respectively.

Assuming that container 44 has been emptied of cream and that a quantity of cream remains in container 46 at the time the serviceman next services the coffee vending machine; container 44 is removed and a new container containing cream replaced therefor with unit 302 being shifted to the right-hand disposition of the same as illustrated by dotted lines in FIG. 2. The tube 192 is then placed in the notch therefor in unit 302 whereby the mechanism will sense emptying of container 46 and switch the same over to dispensing cream from the new container 44. It is to be appreciated that upon swinging movement of unit 302 to the right-hand position of the same, the switch arm 324 moves off of cam 326 whereby the switch arms 400 and 480 of polarizing switch 320 are permitted to shift into engagement with contacts 472 and 484 respectively. In this instance it can be seen that when the switch arm 412 of relay 338 is in engagement with contact 468, the solenoid 198 is initially energized by virtue of line 402 being connected to line 486 through switch arm 480 and contact 484 of polarizing switch 320. Furthermore, upon energization of coil 344 of relay 338 when tube 192 is empty of cream and light rays are thereby permitted to pass through such tube and onto photoelectric cell 318, solenoid 196 will be energized through a circuit including contact 474 of relay 338, line 476, contact 372 and switch arm 400 of polarizing switch 320 and thence line 402 to the coil 460 of solenoid 196 via lead 464.

In the next servicing operation, the empty container 46 is replaced by a full container of cream and the unit 302 is again shifted to the left-hand disposition of the same with the tube 190 being passed therethrough.

Refrigeration unit 14 maintains the interior of cabinet 12 in a cool condition with fan means 330 forcing air from the interior of cabinet 12 over the evaporator of refrigeration unit 14. Not only is the cream in containers 44 and 46 maintained at a predetermined low temperature, but cream in tubes 190 and 192 is also maintained at such temperature because the outer extremities of the tubes disposed on carriage 236 are kept in the interior of cabinet 12 until moved outwardly through opening 32 upon actuation of the cream dispensing mechanism.

Having thus described the invention, what is claimed as new and desired to be secured by Letters Patent is:

1. In liquid dispensing mechanism, a plurality of sources of liquid to be dispensed; liquid conveying means extending from each of said sources to a delivery station, each of said liquid conveying means having a portion capable of transmitting light energy therethrough; independently operable pump means in each of said liquid conveying means for causing liquid to be drawn from a respective source and directed to said delivery station through a corresponding conveying means upon actuation of a selected pump means; means operably connected to each of said pump means for selectively actuating the latter; light source means adapted to be disposed adjacent said portion of one of the conveying means for directing light rays therethrough; light sensing means adapted to be positioned adjacent said light source means for sensing passage of light through said portion of the respective conveying means and thereby sense cessation of passage of liquid therethrough upon depletion of the liquid at a corresponding source; and means responsive to said sensing means for deactivating said selected pump means connected to said depleted source and for activating another one of said pump means.

2. Liquid dispensing mechanism as set forth in claim 1 wherein is provided a common prime mover for said pumps and clutch means operably connecting said prime mover to each of the pumps for permitting independent operation of the latter.

3. Liquid dispening mechanism as set forth in claim 2 wherein is provided electrically operated means for engaging and disengaging respective clutches between said prime mover and corresponding pumps, and electrically operated structure connected to said electrically operated means for effecting disengagement of one of the clutches and engagement of another of such clutches in response to said light sensing means sensing passage of light through said portion of a respective liquid conveying means upon cessation of passage of liquid therethrough and thereby depletion of the liquid at said source.

4. Liquid dispensing mechanism as set forth in claim 3 wherein said light source means comprises an electric light and said light sensing means comprises a photoelectric cell operably coupled to said electrically operated structure for effecting energization of the latter in response to said photoelectric cell sensing passage of light through said portion of the corresponding liquid conveying means.

5. Liquid dispensing mechanism as set forth in claim 1 wherein is provided manually actuatable means connected to said pumps for permitting selective operation of the latter independently of said light source means and said light sensing means to permit priming of the liquid conveying means for initial operation thereof.

6. Liquid dispensing mechanism as set forth in claim 1 wherein said light source means and said light sensing means are movable to positions adjacent any one of the liquid conveying means to thereby permit sensing of cessation of passage of liquid through any of the liquid conveying means.

7. Liquid dispensing mechanism as set forth in claim 2 wherein is provided electrical circuit means connected to said prime mover and electrical switch means in said circuit means for deenergizing said prime mover, there being means operably associated with said electrical switch means for opening the latter to deactivate the prime mover after a predetermined amount of liquid has been directed through a respective liquid conveying means from said source to the delivery station.

8. In liquid dispensing mechanism, a plurality of sources of liquid to be dispensed; liquid conveying means extending from each of said sources to a delivery station, each of said liquid conveying means provided with a portion capable of transmitting light rays therethrough; a pump in each of said liquid conveying means for causing liquid to be drawn from a respective liquid source and directed to said delivery station through a corresponding liquid conveying means upon actuation of a selected pump; a prime mover; clutch means connecting said prime mover to each of said pumps; solenoid means operably joined to each of said clutches for disengaging or engaging corresponding clutches in response to energization or deenergization of a respective solenoid; a light source adapted to be disposed adjacent said portion of one of the liquid conveying means for directing rays of light therethrough; a photoelectric cell adapted to be disposed adjacent said light source for sensing passage of light rays through said portion of the corresponding liquid conveying means upon cessation of passage of liquid through the corresponding liquid conveying means and thereby depletion of the liquid at a respective source; and relay means operably joined to said photoelectric cell for changing the condition of energization of a pair of said solenoids so as to effect disengagement of the clutch operably joined to the pump in the liquid conveying line joined to the source which has become depleted, and for engaging the clutch connected to another one of said pumps to effect flow of liquid from a source having a supply of liquid to be directed to said delivery station.

9. In liquid dispensing mechanism, a housing provided with an opening therein; closure means swingably mounted on said housing in normal closing relationship to said opening; a source of said liquid within the housing; a carriage shiftably mounted within the housing and movable toward and away from said opening, said carriage including an extension engageable with the closure means to open the latter and disposed to project outwardly through said opening when the carriage is at the outermost end of its path of travel; liquid conveying means extending from said liquid source to said carriage and having an outlet end terminating adjacent the outer extremity of said extension, said liquid conveying means being of sufficient length to permit the carriage to shift along said path of travel thereof without displacement of the liquid conveying means from said liquid source; selectively operable means joined to said liquid conveying means for causing liquid to be drawn from said liquid source and directed to said outlet end of the liquid conveying means for delivery therefrom upon actuation of said selectively operable means; a prime mover; releasable means for releasably connecting the selectively operable means to said prime mover; carriage shifting means operably joining the prime mover to said carriage for moving the latter toward and away from said opening; and means operably associated with said prime mover, said selectively operable means and said carriage shifting means, for initially successively commencing operation of said prime mover, then the carriage shifting means to cause said extension of the carriage to engage and open said closure means as the extension is moved outwardly of the housing through said opening, and subsequently actuating said releasable means to couple the selectively operable means to said prime mover for causing liquid to be drawn from said source and then conveyed through said liquid conveying means for ultimate discharge through said outlet end thereof, and for thereafter successively deactivating said releasable means to effect discontinuance of operation of said selectively operable means to stop flow of liquid through said liquid conveying means, and followed by return of the carriage to the innermost end of the path of travel thereof by said carriage shifting means, and finally effecting deactivation of said prime mover.

10. Liquid dispensing mechanism as set forth in claim 9 wherein said releasable means includes selectively actuatable clutch means having interengageable parts connected to said selectively operable means and the prime mover respectively and means for effecting interengagement of the parts of said clutch means upon shifting movement of the carriage to the outer end of its path of travel with the extension thereof projecting through said opening in the housing.

11. Liquid dispensing mechanism as set forth in claim 10 wherein is provided means for shifting the parts of said clutch means out of interengagement upon return of the carriage to the innermost end of its path of travel remote from said one opening in the housing and prior to deactivation of said prime mover.

12. Liquid dispensing mechanism as set forth in claim 9 wherein said carriage includes a unit shiftably carried by the housing, a cam rotatably carried by said prime mover, and follower means swingably mounted on said housing, joined to said unit and operated by said cam to shift the unit toward the outermost end of its path of travel during rotation of the cam through a portion of the normal arcuate path thereof.

13. Liquid dispensing mechanism as set forth in claim 12 wherein is provided resilient means connected to the unit and to the housing respectively for biasing the unit toward the innermost end of its path of travel.

14. Liquid dispensing mechanism as set forth in claim 9 wherein said selectively operable means includes a pump provided with a casing receiving a stretch of the liquid conveying means therewithin and including a plurality of spaced roller means engageable with the liquid conveying means and operably connected to said prime mover through said releasable means for forcing liquid therethrough in one direction in response to rotation of said roller means by said prime mover.

15. In liquid dispensing mechanism, a housing provided with an opening therein; closure means swingably mounted on said housing in normal closing relationship to said opening; a plurality of sources of liquid to be dispensed, within the housing; a carriage shiftably mounted within the housing and movable toward and away from said opening, said carriage including an extension engageable with the closure means to open the latter and disposed to project outwardly through said opening when the carriage is at the outermost end of its path of travel; liquid conveying means extending from each of said liquid sources to said carriage and having respective outlet ends terminating adjacent the outer extremity of said extension, said liquid conveying means being of sufficient length to permit the carriage to shift along said path of travel thereof without displacement of the liquid conveying means from corresponding liquid sources; selectively operable means joined to each of said liquid conveying means for causing liquid to be drawn from a corresponding liquid source and directed to respective outlet ends of the liquid conveying means for delivery therefrom upon actuation of an individual selectively operable means; a prime mover; releasable means for each of said selectively operable means for releasably connecting each of the latter to said prime mover; carriage shifting means operably joining the prime mover to said carriage for moving the latter toward and away from said opening along the path of travel thereof; means associated with at least one of said liquid conveying means for sensing cessation of passage of liquid therethrough upon depletion of the liquid at a corresponding source; means responsive to said sensing means and connected to said releasable means for disconnecting the selectively operable means from said prime mover, corresponding to the liquid conveying means leading from the depleted source of liquid, and for connecting the selectively operable means joined to another one of said liquid conveying means leading from a source of liquid; and means operably associated with said prime mover, said selectively operable means and said carriage shifting means, for initially successively commencing operation of said prime mover, then the carriage shifting means to cause said extension of the carriage to engage and open said closure means as the extension is moved outwardly of the housing through said opening, and subsequently actuating the releasable means associated with the selectively operable means joined to the liquid conveying means having the sensing means associated therewith to couple the corresponding selectively operable means to said prime mover for causing liquid to be drawn from the respective liquid source and then conveyed through said liquid conveying means for ultimate discharge through said outlet end thereof, and for thereafter successively deactivating said releasable means previously actuated, to effect discontinuance of operation of said selectively operable means associated therewith to stop flow of liquid through the corresponding liquid conveying means, and followed by return of the carriage to the innermost end of the path of travel thereof by said carriage shifting means, and finally effecting deactivation of said prime mover.

16. In liquid dispensing mechanism, a housing provided with an opening therein; closure means swingably mounted on said housing in normal closing relationship to said opening; a source of said liquid within the housing; a carriage shiftably mounted within the housing and movable toward and away from said opening, said carriage including extension means engageable with the closure means to open the latter and disposed to project outwardly through said opening when the carriage is at the outermost end of its path of travel; flexible liquid conveying means extending from said liquid source to said carriage and having an outlet end terminating adjacent said extension means, said liquid conveying means being of sufficient length to permit the carriage to shift along said path of travel thereof without displacement of the liquid conveying means from said liquid source; selectively operable means joined to said liquid conveying means for causing liquid to be drawn from said liquid source and directed to said outlet end of the liquid conveying means for delivery therefrom upon actuation of said selectively operable means; means operably connected to said carriage for shifting the latter toward and away from said closure means; and means for maintaining the interior of the housing at a predetermined temperature different from that of the surrounding atmosphere.

17. In liquid dispensing mechanism, a housing provided with an opening therein; closure means swingably mounted on said housing in normal closing relationship to said opening; a source of said liquid within the housing; a carriage shiftably mounted within the housing and movable toward and away from said opening, said carriage including extension means engageable with the closure means to open the latter and disposed to project outwardly through said opening when the carriage is at the outermost end of its path of travel; flexible liquid conveying means extending from said liquid source to said carriage and having an outlet end terminating adjacent said extension means, said liquid conveying means being of sufficient length to permit the carriage to shift along said path of travel thereof without displacement of the liquid conveying means from said liquid source; selectively operable means joined to said liquid conveying means for causing liquid to be drawn from said liquid source and directed to said outlet end of the liquid conveying means for delivery therefrom upon actuation of said selectively operable means; means operably connected to said carriage for shifting the latter toward and away from said closure means; and means communicating with the interior of said housing for maintaining the same at a substantially lower temperature than that of the surrounding atmosphere so as to refrigerate the liquid at said source.

18. Liquid dispensing mechanism as set forth in claim 17 wherein said opening is of relatively small size with respect to the overall dimensions of said housing so as to limit thermal exchange between the interior of the housing and the surrounding atmosphere upon shifting movement of the carriage to the outermost end of its path of travel and thereby resulting in opening of said closure means.

References Cited in the file of this patent

UNITED STATES PATENTS

| | | |
|---|---|---|
| 1,015,254 | Whisler | Jan. 16, 1912 |
| 2,409,245 | Black | Oct. 15, 1946 |
| 2,822,112 | Bremer | Feb. 4, 1958 |
| 2,835,410 | Arnett et al. | May 20, 1958 |
| 2,899,907 | Becher | Aug. 18, 1959 |
| 2,925,045 | Mascaro | Feb. 16, 1960 |